United States Patent
Lee et al.

(10) Patent No.: US 12,093,434 B1
(45) Date of Patent: Sep. 17, 2024

(54) SECURITY CIRCUIT FOR DETECTING PHYSICAL ATTACK ON SYSTEM SEMICONDUCTOR

(71) Applicant: INDUSTRY FOUNDATION OF CHONNAM NATIONAL UNIVERSITY, Gwangju (KR)

(72) Inventors: Young Woo Lee, Gwangju (KR); Jun Young Bae, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 18/390,657

(22) Filed: Dec. 20, 2023

(30) Foreign Application Priority Data

Jun. 16, 2023 (KR) .................... 10-2023-0077336

(51) Int. Cl.
G06F 7/04 (2006.01)
G06F 21/75 (2013.01)
H03K 19/17768 (2020.01)

(52) U.S. Cl.
CPC ....... G06F 21/75 (2013.01); H03K 19/17768 (2013.01)

(58) Field of Classification Search
CPC ........ G06F 21/75; G06F 21/55; G06F 21/725; G06F 21/755; G06F 21/76; H04L 9/003; H04L 9/004; H04L 9/005
See application file for complete search history.

(56) References Cited

U.S. PATENT DOCUMENTS

| | | | | |
|---|---|---|---|---|
| 2001/0026250 | A1* | 10/2001 | Inoue | H04N 5/44504 348/E9.037 |
| 2004/0189348 | A1* | 9/2004 | Tallant, II | H03K 7/08 327/26 |
| 2014/0375303 | A1* | 12/2014 | Helfmeier | G11C 16/22 324/123 R |

(Continued)

FOREIGN PATENT DOCUMENTS

| | | |
|---|---|---|
| KR | 10-2012-0062953 A | 6/2012 |
| KR | 10-2017-0095155 A | 8/2017 |
| KR | 10-2020-0141783 A | 12/2020 |

OTHER PUBLICATIONS

Lee et al., Robust Secure Shield Architecture for Detection and Protection Against Invasive Attacks, IEEE, Sep. 30, 2019, pgs. 3023-3034. (Year: 2019).*

(Continued)

*Primary Examiner* — Philip J Chea
*Assistant Examiner* — Jenise E Jackson
(74) *Attorney, Agent, or Firm* — Studebaker & Brackett PC

(57) ABSTRACT

The present disclosure relates to a security circuit for detecting physical attacks on a system semiconductor. The security circuit includes at least: a shielding layer having a mesh structure composed of a transmission line; a processor configured to determine that a focused ion beam (FIB) circuit editing attack was detected when a difference between predetermined counter output and a first counter output is less than a first reference value; determine that a microprobing attack was detected when a difference between the second counter output and the first counter output exceeds a second reference value; and output an alarm signal when detecting the circuit editing attack or the microprobing attack.

4 Claims, 5 Drawing Sheets

(56) References Cited

U.S. PATENT DOCUMENTS

2018/0166399 A1\* 6/2018 Tehranipoor ............ G06F 21/87
2021/0224449 A1\* 7/2021 Forte ..................... G06F 30/398

OTHER PUBLICATIONS

Manich et al., Detection of Probing Attempts in Secure ICs, IEEE, Jun. 4, 2012, pp. 134-139. (Year: 2012).\*
Bae, Junyeong, et al.; Timestamp-Based Secure Shield Architecture for Detecting Invasive Attacks; IEEE Transactions On Very Large Scale Intergration (VLSI) Systems; vol. 31, No. 9; Sep. 2023; pp. 1358-1367.
Yang, Da Bin, et al.; Asymmetric Signal Scanning Scheme to Detect Invasive Attacks; Smart Media Journal; vol. 12, No. 1; Feb. 2023; pp. 17-23.

\* cited by examiner

SECURITY CIRCUIT FOR DETECTING PHYSICAL ATTACK ON SYSTEM SEMICONDUCTOR

CROSS REFERENCE TO RELATED APPLICATION

The present application claims priority to Korean Patent Application 10-2023-0077336, filed on Jun. 16, 2023, the entire contents of which are incorporated herein for all purposes by this reference.

BACKGROUND

Technical Field

Various embodiments of the present disclosure relate to a security circuit for detecting physical attacks on a system semiconductor.

Description of the Related Art

Various physical attacks and software attacks on semiconductor chips can be threats to products using a System on Chip (SoC) and application services using these products. Attackers may perform reverse engineering on integrated circuits and freely change operation modes of the circuits or manipulate data stored in memories using obtained information.

A physical invasive attack on semiconductor chips may be a type that directly accesses a chip and observes or analyzes the internal structure. The attack types may include, in a broad meaning, a chip change type using Focused Ion Beam (FIB) equipment and a circuit modification type through microprobe access. The FIB attack type may mean a type that freely disconnects or connects a metal line using an ion beam and the microprobing attack type may mean a type that reads out a state value of a specific metal line. Invasive attacks on semiconductor chips may cause realistic problems such as hacking important data or releasing entrance security.

PRIOR ART DOCUMENT

Patent Document (Patent Document 0001) Korean Patent Application Publication No. 10-2020-0141783 (2020.12.21.)
(Patent Document 0002) Korean Patent Application Publication No. 10-2017-0095155 (2017.08.22.)

SUMMARY

As the number of circuits that require protection in system semiconductors increases, the number of metal wires to be tested increases, which results in a problem of an increase in hardware overhead and test cycle.

The present disclosure can provide a security circuit that detects a microprobing or circuit editing attack by checking a delay time and an early arrival time of a signal reciprocating through a transmission line using a counter to provide same hardware overhead and analysis time regardless of increase of circuits requiring protection.

In accordance with various embodiments, a security circuit for detecting physical attacks on a system semiconductor includes: a shielding layer having a mesh structure composed of a transmission line; and a processor, wherein the processor may be set to: transmit a first step pulse signal to a first point of the transmission line; check a first point in time when a voltage value of a first reflected signal, which is a signal formed by reflection of the first step pulse signal at a second point of the transmission line, reaches a first voltage value at the first point, and store first counter output corresponding to the first point in time into a register; check a second point in time when the voltage value of the first reflected signal reaches a second voltage value at the first point, and store second counter output corresponding to the second point in time into the register; determine that a focused ion beam (FIB)FIB circuit editing attack was detected when a difference between predetermined counter output and the first counter output is less than a first reference value; determine that a microprobing attack was detected when a difference between the second counter output and the first counter output exceeds a second reference value; and output an alarm signal when detecting the circuit editing attack or the microprobing attack.

The security circuit according to the present disclosure uses arrival delay of a reciprocation signal due to a microprobing attack and an early arrival time of a reciprocation signal due to a circuit editing attack, thereby being able to provide an effect of reducing hardware overhead and attack analysis time and increasing accuracy in detection of attacks of the types described above.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
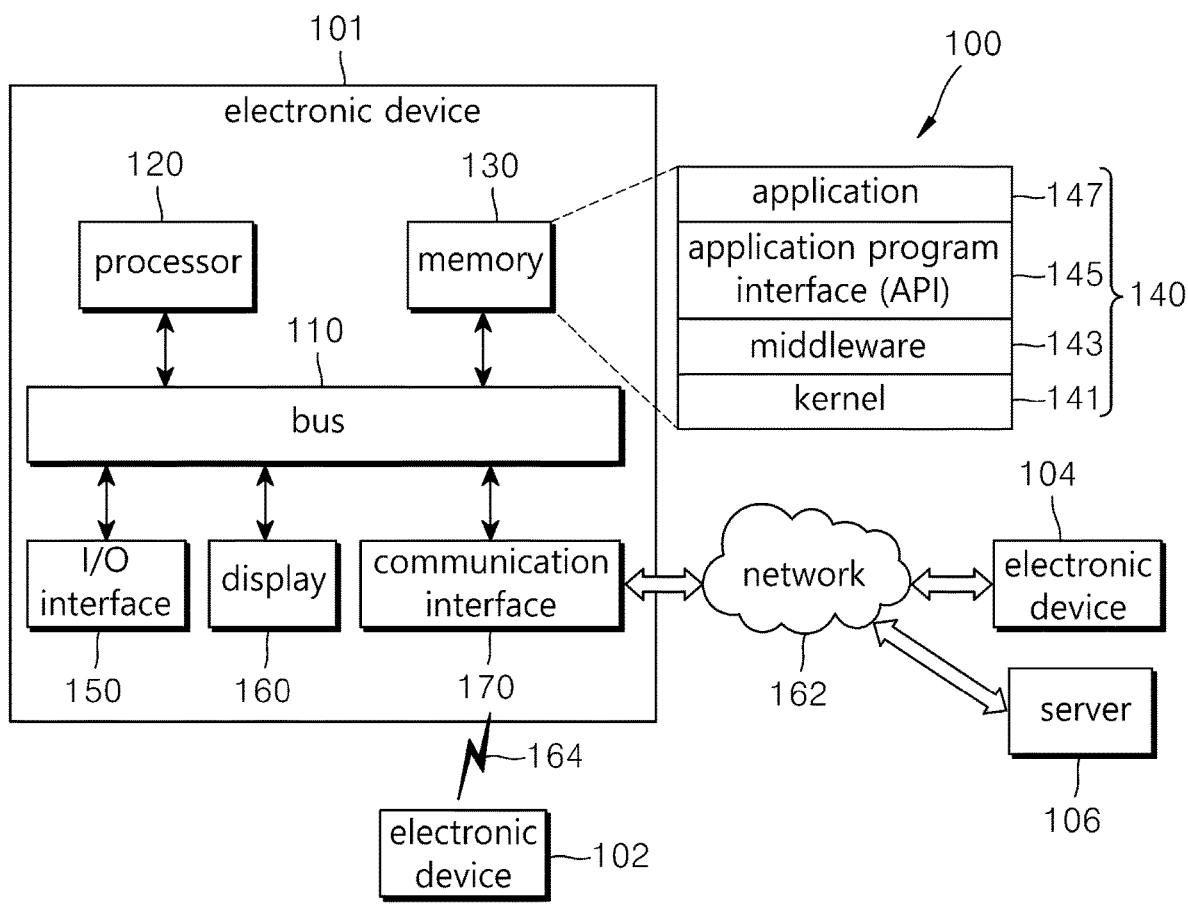
FIG. 1 is a block diagram of an electronic device and a network according to various embodiments of the present disclosure.

Hereafter, various embodiments of the present disclosure are described with reference to the accompanying drawings. Embodiments and terms used in the embodiments are not intended to limit the technical features described herein to specific embodiments and should be understood as including various changes, equivalents, and/or replacements of corresponding embodiments. In the description of drawings, similar components may be given similar reference numerals. Singular forms are intended to include plural forms unless the context clearly indicates otherwise. In the specification, the terms "A or B" or "at least one of A and/or B" may include all possible combinations of items to be enumerated together. The terms such as "first" and "second"

used in various embodiments may modify corresponding components regardless of the order or priority and are used only to discriminate one component from another component without limiting the components. When a (e.g., first) component "is connected to (functionally or in terms of communication)" or "accesses" another (e.g., second) component, the component may be connected to the another component directly or through another component (e.g., a third component).

In the specification, the term "configured (or set) to ~" may be interchangeably used with, for example, "suitable for ~", "having ability to ~", "~ changed to ~", "made to ~", "being capable of ~", or "designed to ~" in terms of hardware or software, depending situations. In some situations, the term "device configured to" may refer to that the device "is capable of doing" with other devices or parts. For example, a "processor configured to perform expressions A, B, and C" may refer to an exclusive processor (e.g., an embedded processor) for performing the corresponding operations or a generic-purpose processor (e.g., a CPU or an application processor) being capable of performing the corresponding operations by executing one or more software programs stored in a memory device.

Electronic devices according to various embodiments of the present disclosure may include, for example, at least one of a smartphone, a tablet PC, a desktop, a laptop, a netbook, a workstation, and a server.

An electronic device 101 in a network environment 100 according to various embodiments is described with reference to FIG. 1. The electronic device 101 may include a bus 110, a processor 120, a memory 130, an I/O interface 150, a display 160, and a communication interface 170. In another embodiment, the electronic device 101 may not include at least one of the components or may additionally include other components. The bus 110 may include a circuit that connects the components 110~170 and transmits communication (e.g., control messages or data) between the components. The processor 120 may include one or more of a central processing unit, an application processor, and a communication processor (CP). The processor 120, for example, can perform operations or data processing about control and/or communication of one or more other components of the electronic device 101.

The memory 130 may include a volatile and/or nonvolatile memory. The memory 130 can store, for example, instructions or data related to at least one other component of the electronic device 101. According to an embodiment, the memory 130 can store software and/or a program 140. The program 140 may include a kernel 141, a middleware 143, an application programming interface (API) 145, and/or an application program (or an "application") 147, etc. At least some of the kernel 141, middleware 143, or API 145 may be referred to as an operating system. The kernel 141, for example, can control or manage system resources (e.g., the bus 110, processor 120, or memory 130) that are used to perform operations or functions that are implemented by other programs (e.g., the middleware 143, the API 145, or the application program 147). Further, the kernel 141 can provide an interface that can control or manage system resources, by accessing individual components of the electronic device 101 through the middleware 143, the API 145, or the application program 147.

The middleware 143, for example, can function as a relay so that the API 145 or the application program 147 can transmit and receive data by communicating with the kernel 141. Further, the middleware 143 can process one or more work requests received from the application program 147 in order of priority. For example, the middleware 143 can give a priority to be able to use system resources (e.g., the bus 110, the processor 120, or the memory 130) of the electronic device 101 to at least one of the application programs 147 and can process one or more work requests. The API 145, which is an interface for the application 147 to control a function provided to the kernel 141 or the middleware 143, for example, may include at least one interface or function (e.g., instruction) for file control, window control, image control, or text control. The I/O interface 150, for example, can transmit instructions or data input from a user or another external device to other component(s) of the electronic device 101 or can output instructions or data received from other component(s) of the electronic device 101 to a user or another external device.

The display 160, for example, may include a Liquid Crystal Display (LCD), a Light Emitting Diode (LED) display, an Organic Light Emitting Diode (OLED) display, or a Micro Electronic Mechanical System (MEMS) display, or an electronic paper display. The display 160, for example, can display various contents (e.g., a text, an image, a video, an icon, and/or a symbol) to a user. The display 160 may include a touch screen and, for example, can receive touching, gesturing, approaching, or hovering input by an electronic pen or a part of the body of a user. The communication interface 170, for example, can set communication between the electronic device 101 and an external device (e.g., a first external electronic device 102, a second external electronic device 104, or a server 106). For example, the communication interface 170 can be connected to the network 162 and can communicate with an external device (e.g., the second external electronic device 104 or the server 106) through wireless communication or wired communication.

The wireless communication, for example, may include cellular communication using at least one of LTE, LTE-A (LTE Advance), Code Division Multiple Access (CDMA), Wideband CDMA (WCDMA), Universal Mobile Telecommunications System (UMTS), Wireless Broadband (WiBro), and Global System for Mobile Communications (GSM). According to an embodiment, the wireless communication may include at least one of Wireless Fidelity (WiFi), Bluetooth, Bluetooth Low Energy (BLE), Zigbee, Near Field Communication (NFC), magnetic secure transmission, Radio Frequency (RF), or Body Area Network (BAN). According to an embodiment, the wireless communication may include GNSS. GNSS, for example, may be a Global Positioning System (GPS), a Global Navigation Satellite System (Glonass), a Beidou Navigation Satellite System (hereafter, "Beidou"), or a Galileo, the European global satellite-based navigation system. In the following description, "GPS" may be used interchangeably with "GNSS". The wired communication, for example, may include at least one of a Universal Serial Bus (USB), a High Definition Multimedia Interface (HDMI), an RS-232 (Recommended Standard-232), power line communication, or a Plain Old Telephone Service (POTS). The network 162 may include at least one of telecommunication networks, for example, a computer network (e.g., LAN or WAN), the internet, and a telephone network.

The first and second external electronic devices 102 and 104 may be devices that are the same kind as or different kinds from the electronic device 101. According to various embodiments, all or some of operations that are performed by the electronic device 101 may be performed by another electronic device or a plurality of other electronic devices (e.g., the electronic devices 102 and 104 or the server 106). According to an embodiment, when the electronic device 101 has to perform a function or a service automatically or due to a request, the electronic device 101 may request at least partial function related to the function or the service to another device (e.g., the electronic devices 102 and 104 or the server 106) additionally or instead of performing the function or the service by itself. Another electronic device (e.g., the electronic devices 102 and 104 or the server 106) can perform the requested function or the additional function and transmit the result to the electronic device 101. The electronic device 101 can provide the requested function or service on the basis of the received result or by additionally processing the received result. To this end, for example, cloud computing, distributed computing, or client-server computing may be used.

Figure 2:
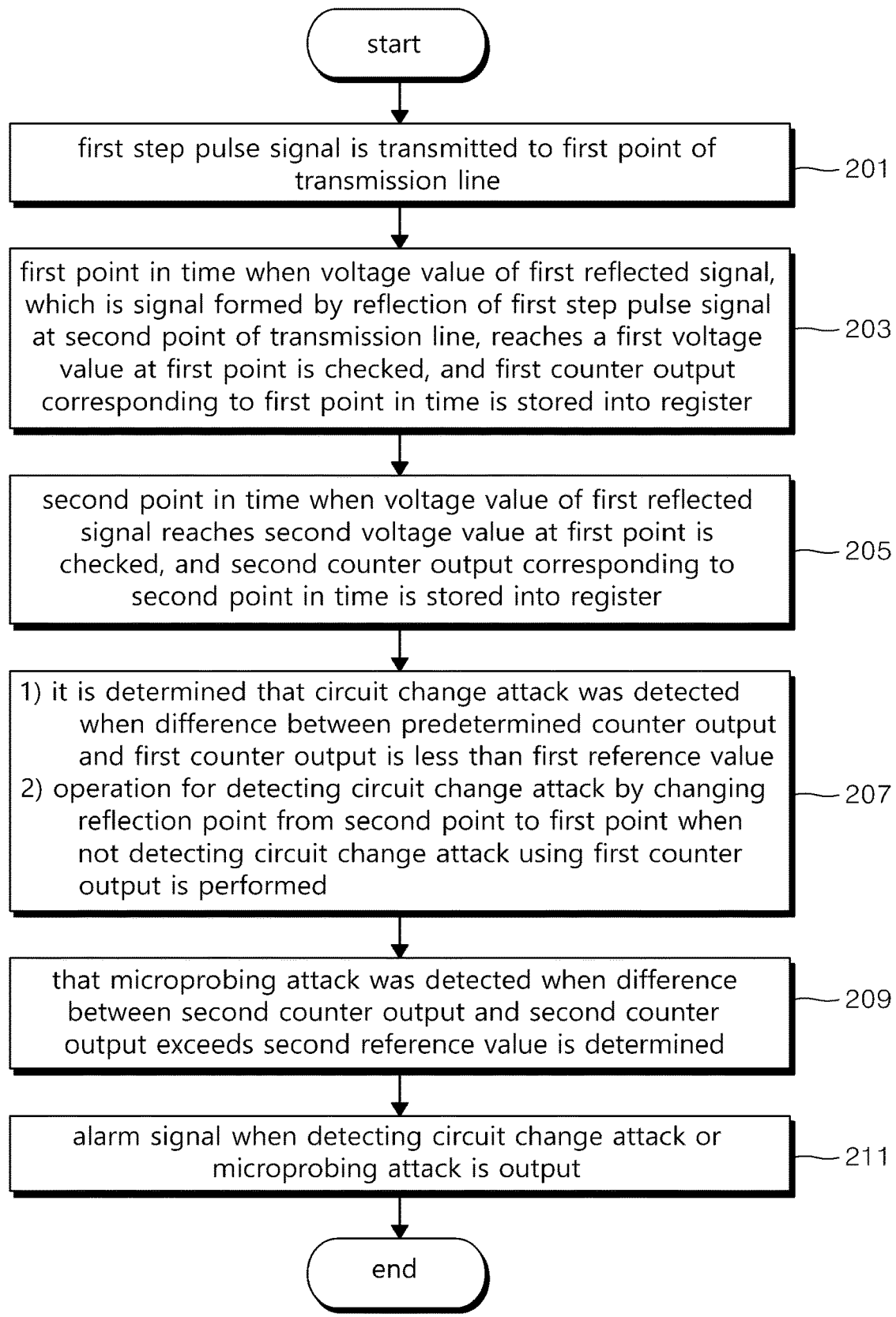
FIG. 2 is a flowchart for explaining operation of a security circuit according to various embodiments of the present disclosure.

FIG. 2 is a flowchart for explaining operation of a security circuit according to various embodiments of the present disclosure.

Figure 3:
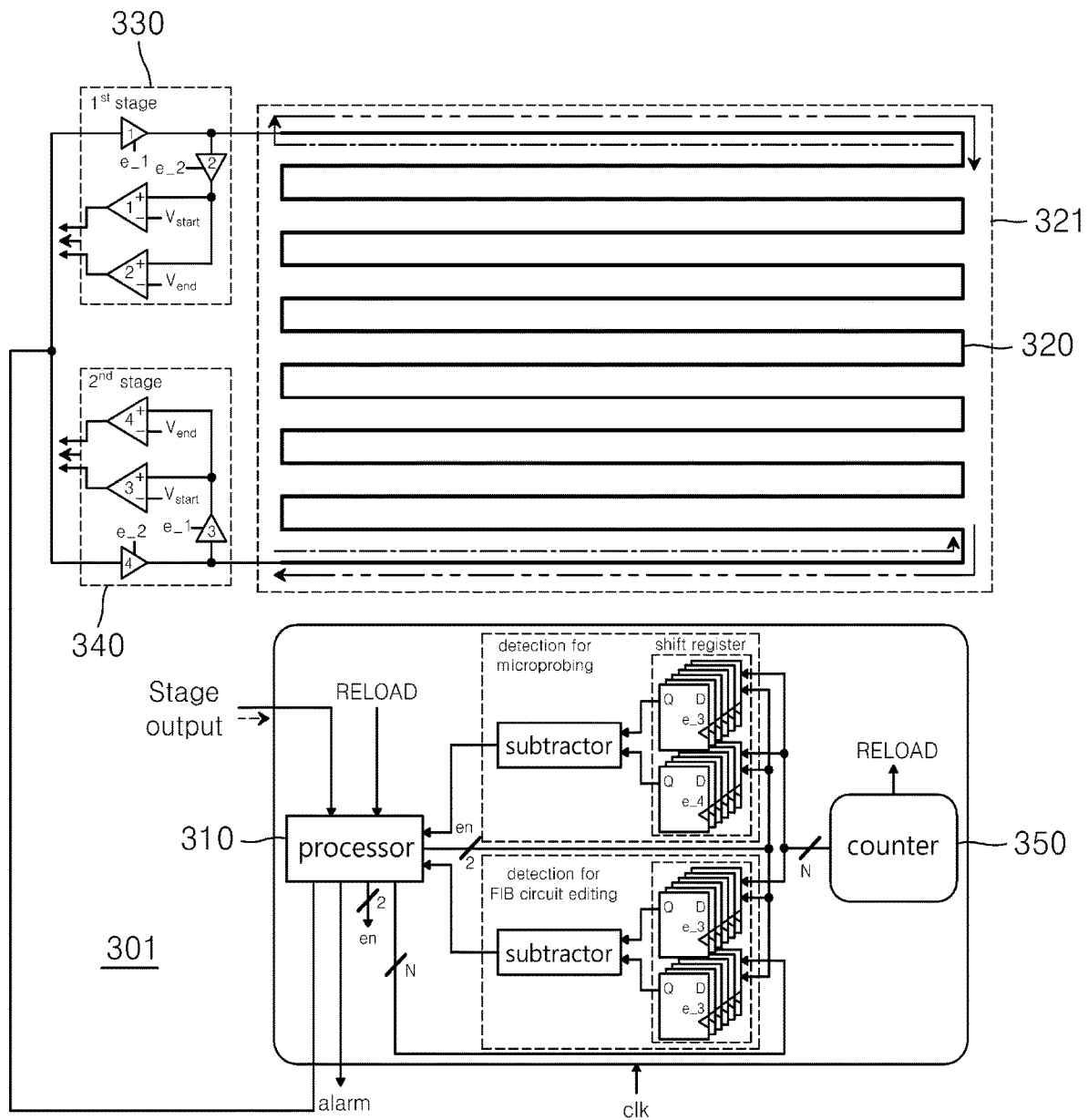
FIG. 3 is a diagram for explaining the structure of the security circuit according to various embodiments of the present disclosure.

FIG. 3 is a diagram for explaining the structure of the security circuit according to various embodiments of the present disclosure.

Figure 4:
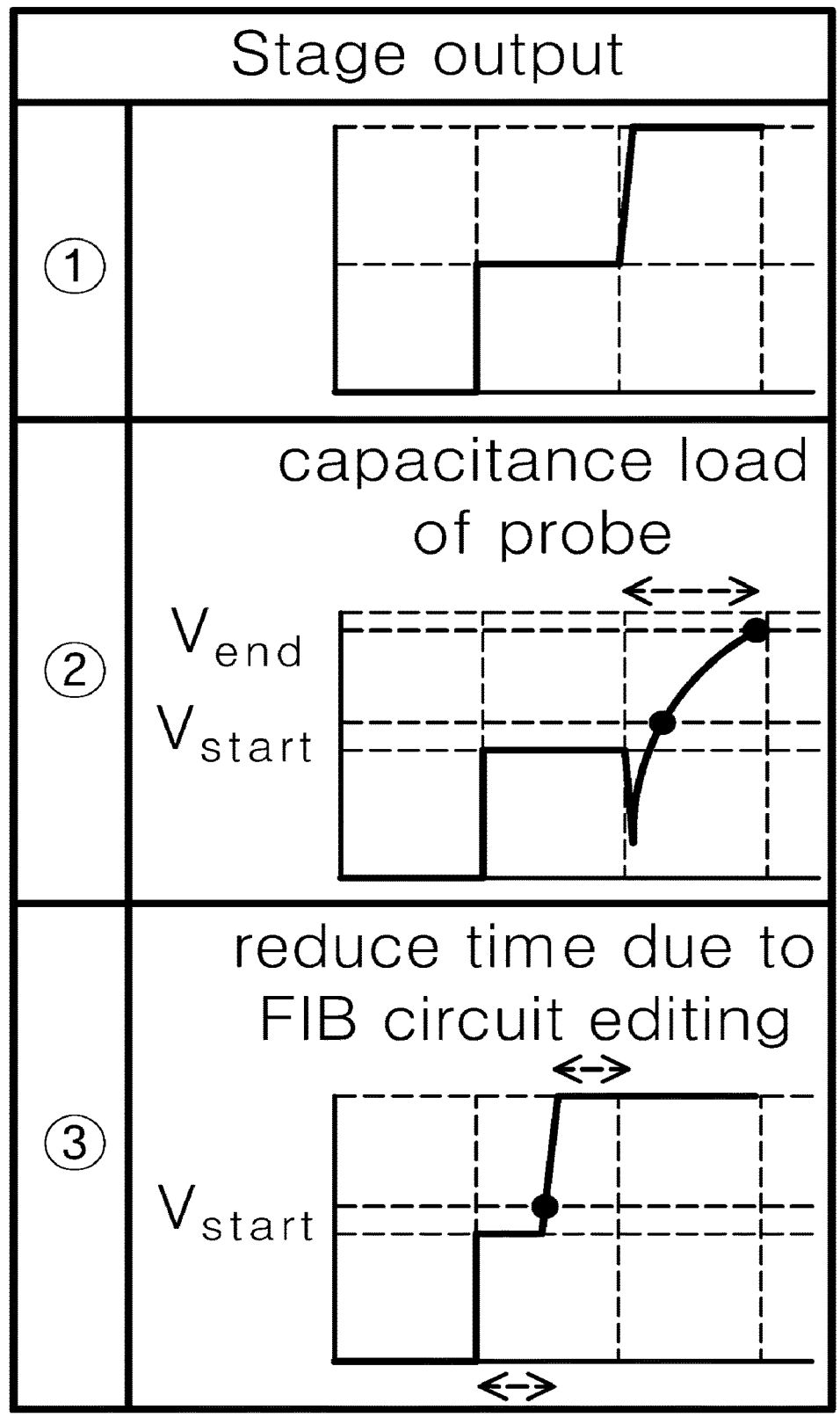
FIG. 4 is a graph showing the voltage values of a first reflected signal in a normal state, a circuit editing attack state, and a microprobing attack state according to various embodiments.

FIG. 4 is a graph showing the voltage values of a first reflected signal in a normal state, a circuit editing attack state, and a microprobing attack state according to various embodiments.

Figure 5:
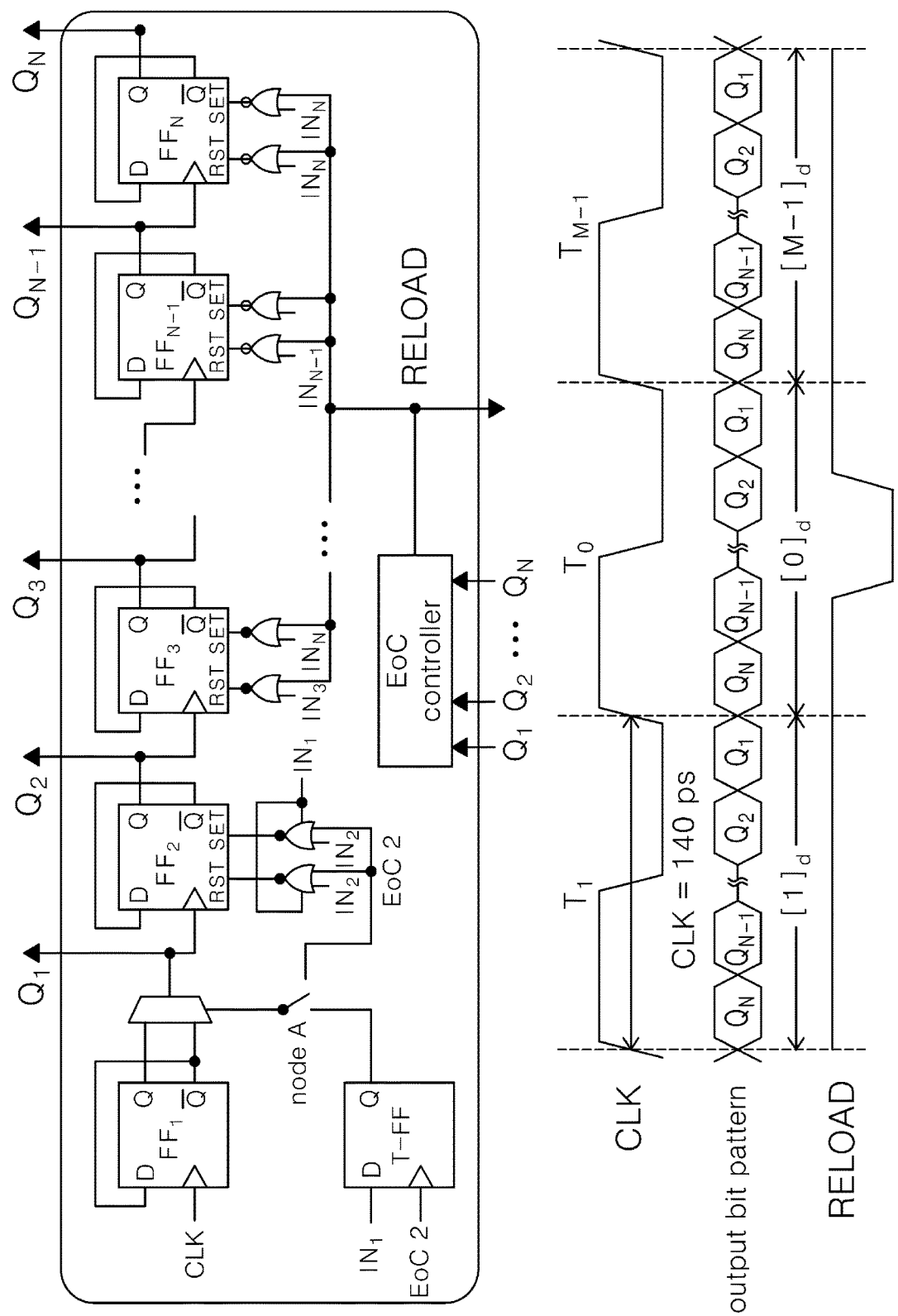
FIG. 5 is a diagram for explaining the structure of a counter according to various embodiments of the present disclosure.

FIG. 5 is a diagram for explaining the structure of a counter according to various embodiments of the present disclosure.

According to various embodiments, an electronic device (e.g., the electronic device 101 of FIG. 1) may include at least one security circuit (e.g., the security circuit 301 of FIG. 3) and the security circuit 301, which is a component for detecting physical attacks on a system semiconductor, may be included in various hardware components (e.g., the processor 120, the memory 130, etc.).

In accordance with various embodiments, referring to FIG. 3, the security circuit 301 may include a processor 310, a shielding layer 321 having a mesh structure composed of a transmission line 320, a first stage circuit 330, a second stage circuit 340, and a counter 350. The processor 310 can operate as a finite state machine (FSM). According to an embodiment, the security circuit 301 can operate on the basis of monitoring time domain reflection (TDR), and in detail, can measure a reflected signal due to impedance at a first point and a second point of the transmission line 320. According to an embodiment, when a signal reflection point is in an open state, as in the graph (of FIG. 4, the voltage at a signal start point (input point) may increase double the initial input voltage after signal reflection.

In operation 201, according to various embodiments, the security circuit 301 (e.g., the processor 310 of FIG. 3) can transmit a first step pulse signal to a first point of the transmission line 320.

In accordance with an embodiment, referring to FIG. 3, the processor 310 can generate and transmit a first control signal (e.g., e_1) and a second control signal (e.g., e_2) a first stage circuit 330 and a second stage circuit 340 before transmitting the first step pulse signal to the transmission line 320.

According to an embodiment, the first stage circuit 330 may include a first tri-state buffer (TBUF), a second tri-state buffer, a first comparator, and a second comparator, and the second stage circuit 340 may include a third tri-state buffer, a fourth tri-state buffer, a third comparator, and a fourth comparator. A comparator can be used to record a signal reciprocating the transmission line 320 (e.g., a first step pulse signal or a first reflected signal) and a tri-state buffer can be used to switch a start point and a reflection point of a step pulse signal on the transmission line 320.

In accordance with an embodiment, referring to FIG. 3, the first stage circuit 330 can enable the first tri-state buffer in the first stage circuit 330 when receiving the first control signal, and can disable the second tri-state buffer in the first stage circuit 330 when receiving the second control signal. In accordance with an embodiment, referring to FIG. 3, the second stage circuit 340 can enable the third tri-state buffer in the second stage circuit 340 when receiving the first control signal, and can disable the fourth tri-state buffer in the second stage circuit 340 when receiving the second control signal.

In accordance with an embodiment, referring to FIG. 3, the first stage circuit 330 can enable the first tri-state buffer and the second tri-state buffer in the first stage circuit 330 when receiving the first control signal and the second signal, and the second stage circuit 340 can disable the third tri-state buffer and the fourth tri-state buffer in the second stage circuit 340 when receiving the first control signal and the second signal.

According to an embodiment, the processor 310 can invert the first control signal and the second control signal after transmitting the first step pulse signal to the transmission line 320. According to an embodiment, the first tri-state buffer and the fourth tri-state buffer can be disabled and the second tri-state buffer and the third tri-state buffer can be enabled by the inverted first control signal and the inverted second control signal. According to an embodiment, as the second tri-state buffer is enabled, a first inverted signal can be input to the first comparator and the second comparator.

In accordance with an embodiment, referring to FIG. 3, the processor 310 can invert the first control signal and the second control signal after transmitting the first step pulse signal to the transmission line 320. According to an embodiment, the first stage circuit 330 can disable the first tri-state buffer and the second tri-state buffer in the first stage circuit 330 when receiving the first control signal and the second signal, and the second stage circuit 340 can enable the third tri-state buffer and the fourth tri-state buffer in the second stage circuit 340 when receiving the first control signal and the second signal.

In operation 203, according to various embodiments, the security circuit 301 (e.g., the processor 310 of FIG. 3), for a first reflected signal that is a reflected signal of a first step pulse signal at a second point of the transmission line 320, can check a first point in time when the voltage value of the first reflected signal reaches a first voltage value at the first point and can store first counter output corresponding to the first point in time into a register. The counter output described in the present disclosure may mean a bit-array that is output from a counter 350, and for example, the counter 350 may employ the structure of the counter 350 of FIG. 5.

In accordance with an embodiment, referring to FIG. 3, the first step pulse signal starting from the first point of the transmission line 320 can be reflected at the second point of the transmission line 320, and the reflected first step pulse signal, that is, a first reflected signal can return to the first point of the transmission line 320.

In accordance with an embodiment, referring to FIG. 3, when the voltage value of the first reflected signal of the transmission line 320 reaches a first voltage value (e.g., $V_{start}$) at the first point, the first comparator in the first stage circuit 330 can transmit information about the corresponding result to the processor 310, and the processor 310 transmits information about a first point in time when the voltage value of the first reflected signal reaches the first voltage value ($V_{start}$) to the register (e.g., a shift register), whereby it is possible to store first counter output corresponding to the first point in time into the register.

In operation 205, according to various embodiments, the security circuit 301 (e.g., the processor 310 of FIG. 3) can check a second point in time when the voltage value of the first reflected signal reaches a second voltage value at the first point, and can store second counter output corresponding to the second point in time into the register.

In accordance with an embodiment, referring to FIG. 3, when the voltage value of the first reflected signal of the transmission line 320 reaches a second voltage value (e.g., $V_{end}$) larger than the first voltage value at the first point, the second comparator in the first stage circuit 330 can transmit information about the corresponding result to the processor 310, and the processor 310 transmits information about a second point in time when the voltage value of the first reflected signal reaches the second voltage value (e.g., $V_{end}$) to the register (e.g., a shift register), whereby it is possible to store second counter output (e.g., a bit-array) corresponding to the second point in time into the register.

In operation 207, according to various embodiments, the security circuit 301 (e.g., the processor 310 of FIG. 3) can determine that a circuit editing attack was detected when the difference between the predetermined counter output and the first counter output is less than a first reference value.

In accordance with an embodiment, referring to FIG. 3, the register (e.g., a shift register) can store predetermined counter output transmitted from the processor 310 and the processor 310 receives the difference value between predetermined counter output calculated in advance through a subtractor and counter output corresponding to a first point in time when first counter output is reached, and can determine that a circuit editing attack was detected when the difference value is less than the first reference value. For example, referring to the graph ③ of FIG. 4, the processor 310 can receive the difference value between predetermined counter output and first counter output corresponding to a first point in time when the voltage value of a first reflected signal reaches a first voltage value (e.g., $V_{start}$). In this case, the predetermined counter output may be counter output corresponding to a point in time when the voltage value of a first reflected signal when the transmission line 320 has a predetermined length (i.e., a normal length) reaches the first voltage value (e.g., $V_{start}$). For example, when an attacker edits the circuit using circuit editing attack equipment and reduces the length of the transmission line 320, the arrival time of a first reflected signal may decrease in accordance with the amount of variation of the length of the transmission line, as in the graph ③ FIG. 4.

According to various embodiments, when the security circuit 301 (e.g., the processor 310 of FIG. 3) did not detect a circuit editing attack using first counter output, the security circuit 301 can change the reflection point from the second point to the first point and perform the operation for detecting a circuit editing attack. According to an embodiment, in order to increase the accuracy in detection of a circuit editing attack, the processor 310 can switch the functions of the first stage circuit 330 and the second stage circuit 340 in operation 201 and can generate and transmit a second step pulse signal to the second point of the transmission line 320.

According to an embodiment, the processor 310 can transmit the second step pulse signal to the second point of the transmission line 320. In this case, the second step pulse signal starting from the second point of the transmission line 320 can be reflected at the first point of the transmission line 320, and the reflected second step pulse signal, that is, a second reflected signal can return to the second point of the transmission line 320.

In accordance with an embodiment, referring to FIG. 3, when the voltage value of a second reflected signal of the transmission line 320 reaches a first voltage value (e.g., $V_{start}$) at the second point, the third comparator in the second stage circuit 340 can transmit information about the corresponding result to the processor 310, and the processor 310 transmits information about a third point in time when the voltage value of the second reflected signal reaches the first voltage value ($V_{start}$) to the register (e.g., a shift register), whereby it is possible to store third counter output (e.g., a bit-array) corresponding to the third point in time into the register.

In accordance with an embodiment, referring to FIG. 3, the register (e.g., a shift register) can store predetermined counter output transmitted from the processor 310 and the processor 310 receives the difference value between predetermined counter output calculated in advance through a subtractor and the third counter output, and can determine that a circuit editing attack was detected when the difference value is less than the first reference value.

In operation 209, according to various embodiments, the security circuit 301 (e.g., the processor 310 of FIG. 3) can determine that a microprobing attack was detected when the difference between the second counter output and the first counter output exceeds a second reference value.

In accordance with an embodiment, referring to FIG. 3, the processor 310 receives the difference value between second counter output calculated through a subtractor and the first counter output, and can determine that a microprobing attack was detected when the difference value exceeds a second reference value. For example, referring to the graph ② of FIG. 3, the processor 310 can receive the difference value between second counter output corresponding to a second point in time when the voltage value of a first reflected signal reaches a second voltage value (e.g., $V_{end}$) and first counter output corresponding to a first point in time when the voltage value of the first reflected signal reaches a first voltage value (e.g., $V_{start}$). For example, when an attacker brings a probe in contact with the transmission line 320, the voltage of a first reflected signal may temporarily decrease and then increase in proportion to the electrostatic capacity of the probe, as in the graph ② of FIG. 4, whereby the signal reciprocation time on the transmission line 320 may increase than that in the normal state.

In operation 211, according to various embodiments, the security circuit 301 (e.g., the processor 310 of FIG. 3) can output an alarm signal when detecting a circuit editing attack or a microprobing attack.

In accordance with various embodiments, a security circuit for detecting physical attacks on a system semiconductor includes: a shielding layer having a mesh structure composed of a transmission line; wherein the processor is set to: generate and transmit a first control signal and a second control signal to the first stage circuit and the second stage circuit before transmitting a first step pulse signal to the transmission line; transmit the first step pulse signal to a first point of the transmission line; check a first point in time when a voltage value of a first reflected signal, which is a signal formed by reflection of the first step pulse signal at a second point of the transmission line, reaches a first voltage value at the first point, and store first counter output corresponding to the first point in time into a register; check a second point in time when the voltage value of the first reflected signal reaches a second voltage value at the first point, and store second counter output corresponding to the second point in time into the register; determine that a focused ion beam (FIB) circuit editing attack was detected when a difference between predetermined counter output and the first counter output is less than a first reference value; determine that a microprobing attack was detected when a difference between the second counter output and the first counter output exceeds a second reference value; and output an alarm signal when detecting the circuit editing attack or the microprobing attack. the first stage circuit is set to enable a first tri-state buffer (TBUF) and a second tri-state buffer in the first stage circuit when receiving the first control signal and the second control and the second stage circuit is set to disable a third tri-state buffer and fourth tri-state buffer in the second stage circuit when receiving the second control signal, and wherein the processor is set to invert a first control signal and a second control signal after transmitting the first step pulse signal to the transmission line, and the first tri-state buffer and the second tri-state buffer are disabled and the third tri-state buffer and the fourth tri-state buffer are enabled by the inverted first control signal and the inverted second control signal.

According to various embodiments, the second voltage value may be larger than the first voltage value.

According to various embodiments, the predetermined counter output may be counter output corresponding to a point in time when the transmission line has a predetermined length and the voltage value of the first reflected signal reaches the first voltage value.

According to various embodiments, the first stage circuit includes a first comparator and a second comparator, in which the first comparator can transmit information about a corresponding result to the processor when the voltage value of the first reflected signal reaches the first voltage value at the first point of the transmission line, and the second comparator can transmit information about a corresponding result to the processor when the voltage value of the first reflected signal reaches the second voltage value at the first point of the transmission line.

The term "module" or "~ unit" used herein may include a unit implemented as hardware, software, or firmware, and for example, may be mutually used with a logic, a logical block, a part, or a circuit. The "module" or "~ unit" may be an integrated part, or the minimum unit or a portion that performs one or more functions. The "module" or "~ unit" may be mechanically or electronically implemented, and for example, may include an application-specific integrated circuit (ASIC) chip, field-programmable gate arrays (FPGAs), or a programmable logic deice that has been known or will be developed and performs some operations, and may be executed by the processor 120. At least some of devices (e.g., modules or the functions thereof) or methods (e.g., operations) according to various embodiments may be implemented into a program module type by commands stored in a computer-readable recording medium (e.g., the memory 130).

When the commands are executed by a processor (e.g., the processor 120), the processor can perform functions corresponding to the commands. The computer-readable recording medium may include a hard disk, floppy disk, a magnetic medium (e.g., a magnetic tape), an optical recording medium (e.g., a CD-ROM and a DVD), a magnet-optical medium (e.g., a floptical disk), a built-in memory, etc. Commands may include codes constructed by a compiler or codes that can be executed by an interpreter. Modules or program modules according to various embodiments may include at least one or more of the components described above, may be partially omitted, or may further include other components. Operations that are performed by modules, program modules, or other components according to various embodiments may be performed sequentially, in parallel, repeatedly, or heuristically, or at least some operations may be performed in another order or omitted, or other operations may be added.

Further, embodiments described herein are proposed to explain and help understand the disclosure and do not limit the scope of the disclosure. Accordingly, the scope of the present disclosure should be construed as including all changes based on the spirit of the disclosure or other various embodiments.

What is claimed is:

1. A security circuit for detecting physical attacks on a system semiconductor, the security circuit comprising:
    a shielding layer having a mesh structure composed of a transmission line;
    a first stage circuit and a second stage circuit and a processor,
    wherein the processor is set to:
    generate and transmit a first control signal and a second control signal to the first stage circuit and the second stage circuit before transmitting a first step pulse signal to the transmission line;
    transmit the first step pulse signal to a first point of the transmission line;
    check a first point in time when a voltage value of a first reflected signal, which is a signal formed by reflection of the first step pulse signal at a second point of the transmission line, reaches a first voltage value at the first point, and store first counter output corresponding to the first point in time into a register;
    check a second point in time when the voltage value of the first reflected signal reaches a second voltage value at the first point, and store second counter output corresponding to the second point in time into the register;
    determine that a focused ion beam (FIB) circuit editing attack was detected when a difference between predetermined counter output and the first counter output is less than a first reference value;
    determine that a microprobing attack was detected when a difference between the second counter output and the first counter output exceeds a second reference value; and
    output an alarm signal when detecting the circuit editing attack or the microprobing attack;
    the first stage circuit is set to enable a first tri-state buffer (TBUF) and a second tri-state buffer in the first stage circuit when receiving the first control signal and the second control and the second stage circuit is set to disable a third tri-state buffer and fourth tri-state buffer in the second stage circuit when receiving the second control signal, and
    wherein the processor is set to invert a first control signal and a second control signal after transmitting the first step pulse signal to the transmission line, and
    the first tri-state buffer and the second tri-state buffer are disabled and the third tri-state buffer and the fourth tri-state buffer are enabled by the inverted first control signal and the inverted second control signal.

2. The security circuit of claim 1, wherein the second voltage value is larger than the first voltage value.

3. The security circuit of claim 2, wherein the predetermined counter output is counter output corresponding to a point in time when the transmission line has a predetermined length and the voltage value of the first reflected signal reaches the first voltage value.

4. The security circuit of claim 3, wherein the first stage circuit includes a first comparator and a second comparator,
- the first comparator transmits information about a corresponding result to the processor when the voltage value of the first reflected signal reaches the first voltage value at the first point of the transmission line, and
- the second comparator transmits information about a corresponding result to the processor when the voltage value of the first reflected signal reaches the second voltage value at the first point of the transmission line.

* * * * *